Patented Dec. 29, 1936

2,066,184

UNITED STATES PATENT OFFICE 2,066,184

INSECTICIDE AND INSECT REPELLENT AND METHOD OF MAKING THE SAME

Louis A. Mikeska, Elizabeth, N. J., assignor to Standard Oil Development Company, a corporation of Delaware No Drawing. Application October 29, 1932, Serial No. 640,345

16 Claims. (Cl. 167—24)

This invention relates to the art of manufacturing improved insecticides or insect repellents containing novel solvents for toxic ingredients and more particularly it relates to the use of improved solvents for the toxic ingredients of fish poisoning plants known as derris, cube, etc. However, the principle of the invention is applicable to the preparation of other insecticidal solutions, as of pyrethrum, nicotine, etc.

It has been known in the art for a considerable time that toxic ingredients for killing insects are obtained from fish poisoning plants, which ingredients are only slightly soluble in the preferred solvents, such as petroleum oils. These toxic ingredients have been extracted from the fish poisoning plants by use of solvents and upon separation from the solvents were found in two forms. One form was crystalline in its structure, which is known as rotenon, while the other was non-crystalline which is known to be a mixture of deguelin, tephrosin, toxicarol, etc., and which we shall hereafter call rotenoids. Both forms are toxic when applied to insects.

The solubility of rotenon or rotenoids in petroleum oils is greater where aromatics, unsaturates, olefins and naphthenes are present. An extract obtained from petroleum oils by the use of solvents such as sulfur dioxide, phenol, aniline, furfural, etc., is found to contain aromatics, unsaturates, olefins and naphthenes. The solubility of rotenon and/or. rotenoids is greater in this extract than in the petroleum oils from which the extract was obtained, but due to the odors and relatively slight improvement of solvent power they are not extensively used as solvents.

An object of this invention is to treat the extract obtained by the use of solvents from petroleum oils to increase the solvent power for the toxic ingredients obtained from fish poisoning plants.

Another object of this invention is to treat the extract obtained by the use of solvents from mineral oils to improve the odor.

These and other objects of the invention will be brought out by referring to the following illustrative example:

Kerosene having a solvent power for rotenon and/or rotenoids of from 0.25 to .050% was extracted with sulfur dioxide. The extract was separated from the solvent by means of distillation and the solvent power for rotenon was found to be increased to 2.3%. The extract was then hydrogenated and marked improvements both in the odor and the solvent power were found. The solvent power of the hydrogenated extract for rotenon and/or rotenoids was increased to 7.2%. Kerosene oil has been mentioned for illustration only and it is not intended as a limitation as extracts obtained from lighter or heavier oils are also used. The solubility of the toxic ingredients has been found to be greater in heavier oils and less in lighter oils though in all hydrogenated extracts it is over 5%. Hydrogenated extracts obtained from heavy oils may be used wherever it is desirable to use an emulsion. Hydrogenated extracts obtained from light oils may be used wherever the extract is to be used as an oil spray. The hydrogenated extracts may also be used with other insecticides such as pyrethrum, nicotine, etc., and also in emulsions containing oil insoluble insecticides such as arsenic compounds.

The hydrogenated oil extracts containing toxic ingredients were found to be suitable for the following uses:

The hydrogenated extract is suitable for use as a solvent in extracting the toxic ingredients from the fish poisoning plants, by percolation or by maceration of the plant in the presence of the solvent and separating the solvent containing the toxic ingredients from the residual solids.

The hydrogenated extract with the toxic ingredients in solution may be diluted and used as a spray in killing insects, such as flies, mosquitoes, etc.

A spray of the emulsion type may be prepared for dipping and spraying animals to control external parasites, such as lice, ticks, mange mites, cattle grub, etc. The emulsion for cattle dips or sprays is prepared by taking hydrogenated oil extract solution containing 5 to 10% of rotenon and/or rotenoids and mixing with water, using a suitable emulsifier such as oil soluble sulfonated soap, fish oil soap, saponin, etc. Other insecticides may be added to the emulsion, such as lead arsenate, nicotine, pyrethrum, etc.

Another use for the spray solution of the emulsion type is for spraying plants such as trees, shrubs, etc. to control parasites such as aphids, leaf hoppers, thrips, greenhouse white flies, tent caterpillars, red spiders, squash bugs, roaches, Mexican bean beetles, Japanese beetles, potato beetles, etc.

Other uses for the hydrogenated oil extract containing rotenon and/or rotenoids in solution are wherever it is necessary to control parasites and an oil solution or water emulsion containing a small amount of oil may be used. The solubility of rotenon and/or rotenoids in the hydrogenated solvent extract allows the preparation of concentrated solutions of the parasitical destroying ingredients which may be diluted to the desired strength solution and other toxic ingredients added if desired, when used. The hydrogenated oil extract may be used as a solvent for pyrethrum, nicotine, etc. A non-toxic disinfectant material may be included if desired.

This invention is not to be limited by any theory or by the examples given merely for the purpose of illustration but only by the following claims in which it is my intention to claim all novelty inherent in the invention.

I claim:

1. An improved insecticide, comprising a hydrogenated extract obtained by extracting petroleum oil with a solvent having a preferential solvent action for aromatic and unsaturated hydrocarbons of a petroleum oil separating the solvent from the extract, hydrogenating the separated extract and dissolving in the hydrogenated extract the active principles of a fish poisoning plant.

2. An improved insecticide according to claim 1, in which the fish poisoning plant is derris root.

3. An improved insecticide according to claim 1, in which the fish poisoning plant is cube root.

4. An improved insecticide according to claim 1, in which the solvent is a hydrogenated sulfur dioxide extract.

5. An improved insecticide according to claim 1, in which the solvent used is a hydrogenated phenol extract.

6. An improved insecticide, comprising a hydrogenated extract obtained by extracting a petroleum oil with a preferential solvent having a preferential solvent action for the aromatic and unsaturated hydrocarbons, separating the solvent from the extract, hydrogenating the separated extract and dissolving in the hydrogenated extract about 5 to 10 percent of the toxic ingredients of a fish poisoning plant in solution.

7. An improved insecticide, comprising an oil solution of active toxic ingredients obtained from a fish poisoning plant and other insecticides dissolved in a hydrogenated oil obtained by extracting a petroleum oil with a solvent having preferential action for the aromatic and unsaturated hydrocarbon, separating the solvent from the extract and hydrogenating the separated extract.

8. An improved insecticide according to claim 7, in which one of the insecticides is pyrethrum.

9. An improved insecticide, comprising an emulsion prepared from an oil solution containing the active toxic ingredients obtained from a fish poisoning plant in solution in a hydrogenated extract obtained by extracting a petroleum oil with a preferential solvent having a preferential action for the aromatic and unsaturated hydrocarbons, separating the solvent from the extract and hydrogenating the separated extract, water, and an emulsifier.

10. An improved insecticide according to claim 9, containing pyrethrum.

11. An improved insecticide according to claim 9, containing nicotine.

12. An improved insecticide according to claim 9, containing an arsenic compound.

13. A method of preparing an improved insecticide comprising extracting the active principles of a plant containing toxic ingredients used for killing insects with a petroleum oil consisting of hydrogenated aromatic and unsaturated hydrocarbons.

14. A method of preparing an improved insecticide, which comprises dissolving active toxic ingredients obtained from a fish poisoning plant in a hydrogenated extract obtained by extracting a petroleum oil with a preferential solvent having a preferential solvent action for the aromatic and unsaturated hydrocarbons, separating the solvent from the extract, and hydrogenating the separated extract.

15. A method of preparing an improved solvent for active toxic ingredients obtained from a fish poisoning plant, which comprises hydrogenating a petroleum oil consisting substantially of aromatic and unsaturated hydrocarbons.

16. A method of preparing an improved solvent for active toxic ingredients obtained from a fish poisoning plant, which comprises extracting a petroleum oil with a solvent having a preferential solvent action for the aromatic and unsaturated hydrocarbons, separating the solvent from the extract and hydrogenating the separated extract.

LOUIS A. MIKESKA.